US012240694B2

(12) United States Patent
Austrheim et al.

(10) Patent No.: US 12,240,694 B2
(45) Date of Patent: Mar. 4, 2025

(54) STATION FOR PROVIDING ACCESS TO CONTENTS IN A STORAGE CONTAINER AND AN AUTOMATED STORAGE AND RETRIEVAL SYSTEM

(71) Applicant: Autostore Technology AS, Nedre Vats (NO)

(72) Inventors: Trond Austrheim, Etne (NO); Magne Hatteland, Stavanger (NO)

(73) Assignee: AutoStore Technology AS, Nedre Vats (NO)

( * ) Notice: Subject to any disclaimer, the term of this patent is extended or adjusted under 35 U.S.C. 154(b) by 854 days.

(21) Appl. No.: 17/288,932

(22) PCT Filed: Nov. 5, 2019

(86) PCT No.: PCT/EP2019/080164
§ 371 (c)(1),
(2) Date: Apr. 27, 2021

(87) PCT Pub. No.: WO2020/094604
PCT Pub. Date: May 14, 2020

(65) Prior Publication Data
US 2021/0387804 A1 Dec. 16, 2021

(30) Foreign Application Priority Data
Nov. 5, 2018 (NO) .................................... 20181416

(51) Int. Cl.
*B65G 1/04* (2006.01)
*B65D 25/04* (2006.01)
(Continued)

(52) U.S. Cl.
CPC ........... *B65G 1/0464* (2013.01); *B65D 25/04* (2013.01); *B65G 1/065* (2013.01); *F16P 3/08* (2013.01)

(58) Field of Classification Search
CPC ...... B65G 1/0464; B65G 1/065; B65D 25/04; F16P 3/08
See application file for complete search history.

(56) References Cited

U.S. PATENT DOCUMENTS 5,820,237 A * 10/1998 Robey .................. A47B 49/002
312/139.2
6,170,929 B1 * 1/2001 Wilson ................... A61B 50/13
221/21
(Continued)

FOREIGN PATENT DOCUMENTS

EP 1 061 013 A1 12/2000
EP 1061013 12/2000
(Continued)

OTHER PUBLICATIONS

Office Action issued in Chinese Application No. 2019800779717 mailed on May 17, 2022 (19 pages).
(Continued)

*Primary Examiner* — Michael Collins
(74) *Attorney, Agent, or Firm* — Baker Botts L.L.P.

(57) ABSTRACT

A station for providing access to contents in a storage container of an automated storage and retrieval system comprising:—an access barrier comprising an opening, and a plurality of covers, wherein each cover is arranged to be selectively deployed to close off a respective portion of the opening;—a loading mechanism arranged to receive the storage container and move it to the opening of the access barrier; and—a housing which is able to prevent access to the opening of the access barrier; wherein the station (10) is arranged to transition between;—a loading configuration in which access to the opening of the access barrier is prevented by the housing, and—an access configuration in which the opening of the access barrier is presented to thereby enable access to contents of the storage container
(Continued)

through the opening. The station is configured to deploy the covers to close off predetermined portions of the opening prior to transition into the access configuration to thereby restrict or permit access to contents of the storage container through predetermined portions of the opening.

15 Claims, 9 Drawing Sheets (51) Int. Cl.
     *B65G 1/06*     (2006.01)
     *F16P 3/08*     (2006.01)

(56) References Cited

U.S. PATENT DOCUMENTS

| | | | | |
|---|---|---|---|---|
| 6,450,598 | B1* | 9/2002 | Hanel | B65G 1/127 |
| | | | | 312/297 |
| 6,994,409 | B2* | 2/2006 | Godlewski | A47B 63/06 |
| | | | | 312/297 |
| 7,809,470 | B2* | 10/2010 | Shoenfeld | G08B 13/2402 |
| | | | | 221/133 |
| 8,019,470 | B2* | 9/2011 | Meek, Jr. | E05B 47/026 |
| | | | | 700/242 |
| 8,123,071 | B2* | 2/2012 | Fitzgerald | B65G 1/04 |
| | | | | 221/124 |
| 10,102,706 | B2* | 10/2018 | Jefferies | G16H 20/13 |
| 10,457,482 | B2* | 10/2019 | Hognaland | B65G 1/0478 |
| 2004/0208731 | A1 | 10/2004 | Evans et al. | |
| 2009/0114672 | A1 | 5/2009 | Schifman et al. | |
| 2014/0249666 | A1 | 9/2014 | Radwallner et al. | |
| 2015/0305500 | A1 | 10/2015 | Biba et al. | |
| 2016/0272421 | A1* | 9/2016 | Hognaland | B65G 1/06 |
| 2017/0053099 | A1 | 2/2017 | Coughlin et al. | |

FOREIGN PATENT DOCUMENTS

| | | |
|---|---|---|
| WO | 03/006345 A1 | 1/2003 |
| WO | WO03/006345 | 1/2003 |
| WO | 2009/057166 A1 | 5/2009 |
| WO | WO2009/057166 | 5/2009 |
| WO | 2015/164264 A1 | 10/2015 |
| WO | WO2015/164264 | 10/2015 |
| WO | WO2016/196815 | 12/2016 |
| WO | WO2017/211596 | 12/2017 |

OTHER PUBLICATIONS

ISRWOISA dated Feb. 4, 2020.
Search Report of Jun. 5, 2019 in NO20181416.
Extended European Search Report issued in counterpart European Application No. 23 21 3985.7 mailed on Feb. 19, 2024 (14 pages).

\* cited by examiner

STATION FOR PROVIDING ACCESS TO CONTENTS IN A STORAGE CONTAINER AND AN AUTOMATED STORAGE AND RETRIEVAL SYSTEM

FIELD OF THE INVENTION

The present invention relates to a storage system for automatic delivery of one or more items stored in compartments of a storage container, and a station for such a storage system.

BACKGROUND OF THE INVENTION

Figure 1:
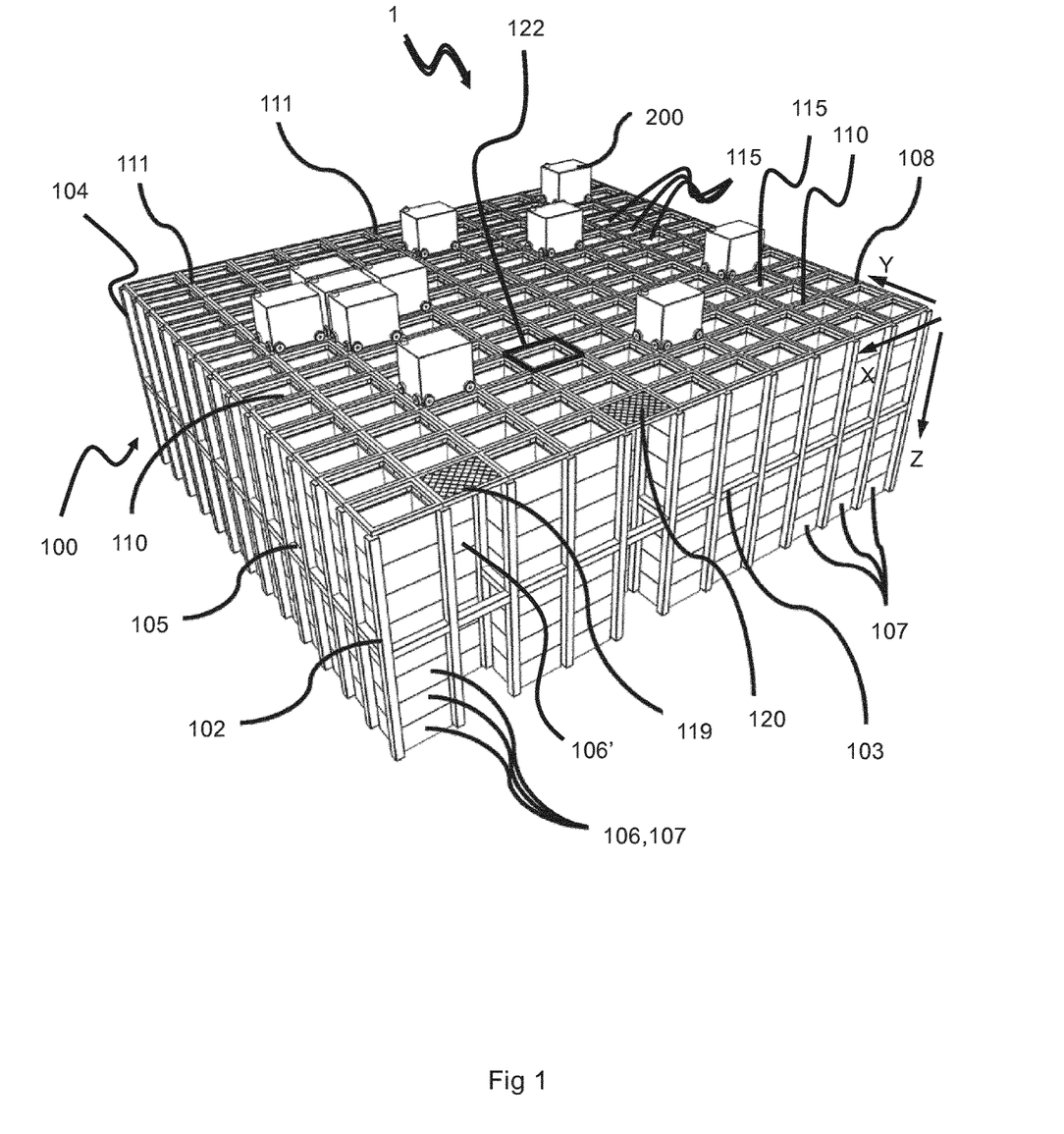
FIG. 1 shows a storage grid arranged for storing storage containers arranged in stacks.

FIG. 1 discloses a framework structure of a typical prior art automated storage and retrieval system.

The framework structure comprises a plurality of upright members and a plurality of horizontal members, which are supported by the upright members. The members may typically be made of metal, e.g. extruded aluminum profiles.

The framework structure defines a storage grid comprising storage columns arranged in rows, in which storage columns store storage containers, also known as containers, which are stacked one on top of another to form stacks. Each storage container may typically hold a plurality of product items (not shown), and the product items within a storage container may be identical or may be of different product types depending on the application. The framework structure guards against horizontal movement of the stacks of storage containers, and guides vertical movement of the containers, but does normally not otherwise support the storage containers when stacked.

A rail system is arranged in a grid pattern across the top of the storage columns, on which rail system a plurality of container handling vehicles are operated to raise storage containers from, and lower storage containers into, the storage columns, and also to transport the storage containers above the storage columns.

When a product item stored in a storage container is to be picked from the storage grid, the container handling vehicle is arranged to pick up the storage container containing that product type and then transport it to a container lift device. The container lift device transports the storage container to a picking and/or supply station, where the product item of the product type is retrieved from the storage container. The storage container with the remaining product items is thereafter returned to the storage grid by means of a container lift device and a container handling vehicle.

The same procedure is used for supplying product items into the storage grid. First, items are supplied into a storage container at a picking and/or supply station. The container lift device then lifts the storage container up to the upper level where a container handling vehicle transports the storage container into its correct position within the storage grid.

A storage control and communication system is used to monitor inventory, to keep track of the location of respective storage containers (within the storage grid and/or during transport), the content of each storage container, etc. Moreover, the storage control and communication system may also comprise, or may be provided in communication with, a control system for controlling the container handling vehicles to control the vehicles to pick the desired storage container and to deliver it at the desired location at the desired time, without colliding with other vehicles.

Typically, a person at the picking and/or supply station is employed by the owner of the storage system, where the person picks a product item out from the storage container and then packs and sends the product item to the end user via a postal service or another delivery service.

However, in some storage systems it may be desired that end user collects the product item at the location of the storage system. Hence, one object of the invention is to provide a storage system which enables such end users to collect product items themselves automatically. Care must be taken, as the interface between the end user and the storage system should not introduce risks for personal injuries (typically fingers or hands getting squeezed by moving parts). Moreover, the person should not get access to other product items than those ordered.

Another object is to provide an end user access to dedicated compartments of a storage container, whereas access is restricted to the other compartments of the storage compartment.

Moreover, only users with a suitable key or key code should be able to access the product item retrieved from the storage system.

SUMMARY OF THE INVENTION

The invention is directed to a station for providing access to contents in a storage container of an automated storage and retrieval system. The station comprising:
   an access barrier comprising an opening, and a plurality of covers, wherein each cover is arranged to be selectively deployed to close off a respective portion of the opening and thereby restrict access therethrough;
   a loading mechanism arranged to receive the storage container and move it to the opening of the access barrier so that contents of the storage container may be accessed through the opening; and
   a housing which is able to prevent access to the opening of the access barrier.
The station is arranged to transition between;
   a loading configuration in which access to the opening of the access barrier is prevented by the housing, and
   an access configuration in which the opening of the access barrier is presented to thereby enable access to contents of the storage container through the opening; and
   wherein the station is configured to deploy the covers to close off predetermined portions of the opening prior to transition into the access configuration to thereby restrict or permit access to contents of the storage container through predetermined portions of the opening.

The station may be connected to a lower part of a storage grid such that a storage container may be retrieved from the storage grid and delivered to the station. The station is configured to close off portions of the storage container, such that only a predetermined item is accessible to the user.

In the loading configuration, the access barrier may be located inside the housing, such that the opening of the access barrier is covered by the housing such that it is not accessible.

The housing may be a frame structure comprising a top cover covering the opening of the access barrier. In embodiments, the housing may comprise a top cover connected to the access barrier and/or the access barrier may be arranged within the housing.

In embodiments, the housing may be a cabinet for accommodating the access barrier. The cabinet may comprise side walls and a top wall surface, for separating the user from the access barrier such that the access barrier is accessible only in the access configuration of the station.

The access barrier may also be arranged in form of a cabinet comprising side walls, located inside a housing. The housing may comprise a top cover arranged to cover the opening of the access barrier.

To provide access to the opening of the access barrier, the top cover may be arranged to be lifted or sliding to provide or restrict access to the opening of the access barrier, or the access barrier may be arranged to move relative to the housing for providing or restricting access.

Thus, when in the access configuration, the access barrier may be moved relative to the housing such that the opening of the access barrier is accessible, or the top cover of the housing may be provided with an opening and lifting mechanism, arranged such that the top cover may be manually or automatically opened and lifted in the access configuration.

In embodiments, the housing may comprise a top cover for closing off the opening of the access barrier to permit or restrict access to the access barrier. The top cover may be pivotably connected to the housing such that the opening of the access barrier can be accessible when the top cover is lifted. The cover may be provided with a locking device such that it is locked in the loading configuration and unlocked in the access configuration. The top cover, when unlocked, may be lifted open manually by a handle or it may be lifted automatically by a motor.

In another embodiment, the moving of the access barrier relative to the housing may be in form of a drawer-like device, arranged such that the access barrier moves relative to the housing while moving from the loading configuration to the access configuration.

Further details to the drawer-like device will be described later.

The station may further comprise a loading mechanism arranged for receiving the storage container from a transfer or delivery column of an automated storage and retrieval grid, and for moving the storage container to the access barrier and for lifting the storage container in the access barrier to the opening of the access barrier.

The loading mechanism may comprise a moving device and/or a lifting device, wherein the lifting device may be moveably arranged on the moving device.

In embodiments, the lifting device may comprise wheels arranged to move on rails provided on the moving device.

The lifting device may also be arranged on a skid or slide system for relative movement between the lifting device and the moving device.

The lifting device may comprise a support device for receiving and supporting a storage container delivered through a delivery column of an automated storage and retrieval grid. Upon receiving a storage container, the lifting device may move on the moving device such that the storage container is transported into the access barrier. Inside the access barrier, the lifting device may lift the storage container to the opening of the access barrier.

Each of the plurality of covers may be pivotably connected to the access barrier adjacent the opening and each cover may be moveable between an initial position in which the cover is not deployed thereby leaving the respective portion of the opening accessible, and a deployed position in which the cover closes off the respective portion of the opening.

Each of the plurality of covers, in the initial position, may extend at least partially in a vertical direction such that it allows the storage container to pass without contact while the storage container is being lifted to the opening of the access barrier, thereby leaving the respective portion of the opening accessible such that contents of the storage container may be accessed through the portion.

In moving into the deployed position, each cover may be operable such that it extends into a lifting path of the storage container when being moved to the opening of the access barrier by the lifting device, so that the storage container urges the cover into its deployed position. That is, each cover may be operated such that it has a vertical angle so that it extends at least partially horizontally to be disposed in the path of a storage container being moved into alignment with the access opening, so that it is urged by movement of the storage container into its deployed position.

The covers may be arranged as flaps pivotably connected to a perimeter of the opening of the access barrier, each flap being operated by a respective independent motor for closing off the respective portion of the opening of the access barrier.

The access barrier may be arranged as a drawer-like device in the housing and the drawer-like device may be arranged to transition between the loading configuration and the access configuration.

The drawer-like device may be actuable by the loading mechanism configured to push the drawer-like device out of the housing.

The drawer-like device may comprise wheels arranged to operate on a secondary rail provided on the loading mechanism.

The secondary rails may be provided on the moving device adjacent to the rails of the lifting device.

The drawer-like device may also be moveable relative to the housing, on a skid system or sliding arrangement connected to the loading mechanism.

The invention is also directed to a system for picking up a storage container containing an ordered item stored in a compartment of the storage container and for delivery of the storage container to a station arranged such that the compartment containing the ordered item is accessible for a user.

The system is defined by an automated storage and retrieval system comprising a station for delivery of one or more items stored in a storage container, the system comprises;
  a storage grid for storing storage containers arranged in stacks,
  a station for providing access to contents in a storage container of an automated storage and retrieval system, the station comprising:
    an access barrier comprising an opening, and a plurality of covers, wherein each cover is arranged to be selectively deployed to close off a respective portion of the opening and thereby restrict access therethrough;
    a loading mechanism arranged to receive the storage container and move it to the opening of the access barrier so that contents of the storage container may be accessed through the opening; and
    a housing which is able to prevent access to the opening of the access barrier;
  wherein the station is arranged to transition between;
    a loading configuration in which access to the opening of the access barrier is prevented by the housing, and
    an access configuration in which the opening of the access barrier is presented to thereby enable access to contents of the storage container through the opening; and
  wherein the station is configured to deploy the covers to close off predetermined portions of the opening prior to transition into the access configuration to thereby restrict or permit access to contents of the storage container through predetermined portions of the opening.

The system may further comprise a plurality of storage containers, wherein each storage container comprises a plurality of compartments with an open end, wherein each of the open ends is closable by the covers of the access barrier.

Each of the plurality of the storage containers may comprise at least one detachable compartment-separating wall. Said detachable walls are arranged such that they can be removed or folded into the bottom of the compartment such that the size of the compartment of the storage container may be adjusted. Preferably, the open end of each of the storage compartments may be closeable by one or more covers of the access barrier.

The system may comprise partition walls and/or outside surface walls positioned to prevent access to the storage grid from outside the station. Thus, contents of the storage grid may primarily be accessed via the opening of the access barrier station and may only be accessed via the opening of the access barrier.

The system may comprise a station as described above in relation to any of the embodiments thereof.

The system may be arranged in connection with a store or a warehouse, where the storage and retrieval grid are located inside the warehouse or store, and the housing including the access barrier is located at the outside and available to customers or users. When an item is ordered by the customer or user, the container handling vehicle retrieves the storage container containing the ordered item and delivers the storage container to the loading mechanism which is arranged to receive the storage container and move it to the opening of the access barrier so that the item in the storage container may be accessed through the opening. The invention, makes sure that only the ordered item is available to the customer or user by operating the deployable covers. So, when the storage contains several items or different items, only the ordered items will be available to the customer or user. Items which should not be available for customers or users will be closed-off by the deployable cover.

The system may also be located inside a supermarket or store, to provide automatic ordering and picking of items from a storage and retrieval grid located adjacent the supermarket or store.

Embodiments of the invention will now be described by way of example only and with reference to the enclosed drawings, where.

DETAILED DESCRIPTION OF PREFERRED EMBODIMENTS

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the station and related methods as well, and vice versa. Hence, any features described in relation to the station only, and/or related methods, are also valid for the system.

With reference to FIG. 1 the storage grid 104 of each storage structure 1 constitutes a framework 100 of in total 143 grid columns, where the width and length of the framework corresponds to the width and length of 13 and 11 grid columns, respectively. The top layer of the framework 100 is a rail system 108 on which a plurality of container handling vehicles 200 are operated.

The framework 100 of the storage system 1 is constructed in accordance with the prior art framework 100 described above, i.e. a plurality of upright members 102 and a plurality of horizontal members 103 which are supported by the upright members 102, wherein the horizontal members 103 include a container handling vehicle rail system 108 of parallel rails 110,111 in the X direction and the Y direction, respectively, arranged across the top of storage columns 105. The horizontal area of a single grid cell 122, i.e. along the X and Y directions, may be defined by the distance between adjacent rails 110 and 111, respectively. In FIG. 1, such a grid cell 122 is marked on the rail system 108 by thick lines. The rail system 108 may also be a double track system (not shown), thus allowing a container handling vehicle 200 having a footprint generally corresponding to the lateral area defined by a grid column 112 to travel along a row of grid columns even if another container handling vehicle 200 is positioned above a grid column neighboring that row. In the double track rail system, the grid cell 122 being sized between the mid-pints of the double tracks.

The container handling vehicle rail system 108 allows the container handling vehicles 200 to move horizontally between different grid locations, where each grid location is associated with a grid cell 122.

In FIG. 1 the storage grid 104 is shown with a height of eight cells. It is understood, however, that the storage grid 104 can in principle be of any size. In particular it is understood that storage grid 104 can be considerably wider and/or longer than disclosed in FIG. 1. For example, the grid 104 may have a horizontal extent of more than 700×700 grid cells 122. Also, the grid 104 can be considerably deeper than disclosed in FIG. 1. For example, the storage grid 104 may be more than twelve grid cells deep.

Figure 2:
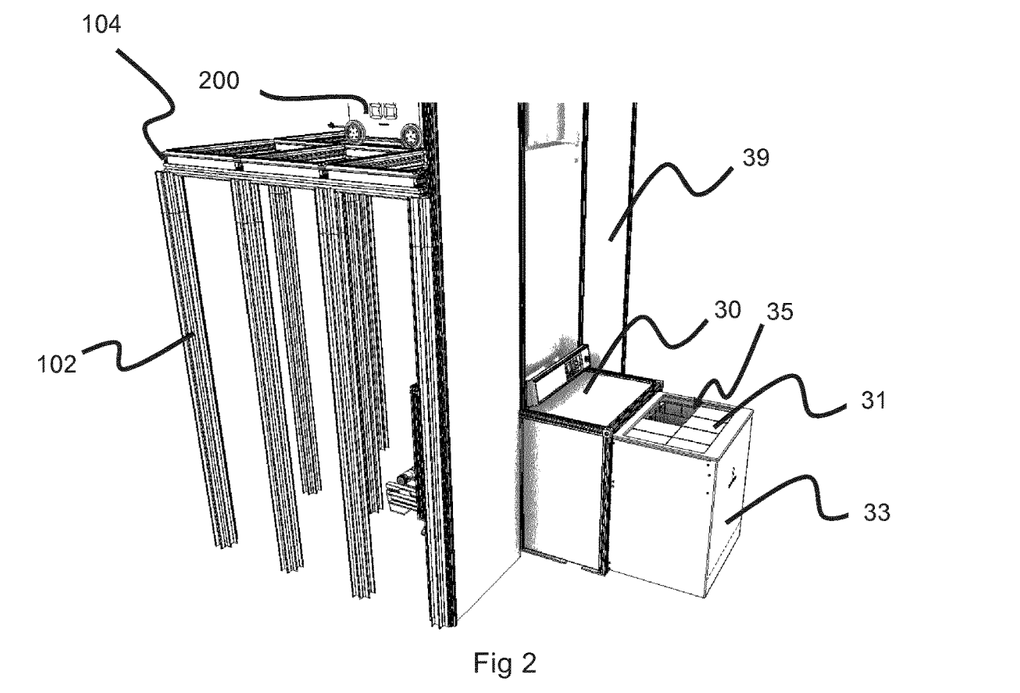
FIG. 2 illustrates a station according to the invention where the station is connected to a storage grid.

FIG. 2 shows a section of a storage grid 104 comprising a picking and/or supply station comprising an access barrier 33 in the form of a drawer-like device. The drawer-like device 33, in a loading configuration, is completely contained in a housing 30. The housing 30 is able to prevent access to the opening 35 of the access barrier 33.

The access barrier 33 is adapted to receive a storage container 106 comprising at least one storage compartment 51 for temporarily storing a product/item to be picked from or supplied to the storage grid 104.

The access barrier 33 comprises an opening 35, and a plurality of covers 31, wherein each cover 31 is arranged to be selectively deployed to close off a respective portion of the opening 35, and thereby restrict access therethrough.

Each of the plurality of covers 31 is pivotably connected to the access barrier 33 adjacent the opening 35, and each cover 31 is moveable between an initial position in which the cover 31 is not deployed thereby leaving the respective portion of the opening 35 accessible, and a deployed position in which the cover 31 closes off the respective portion of the opening 35.

The station is arranged to transition between;
  a loading configuration in which access to the opening 35 of the access barrier 33 is prevented by the housing 30, and
  an access configuration in which the opening 35 of the access barrier 33 is presented to thereby enable access to contents of the storage container 106 through the opening 35.

The station is configured to deploy the covers 31 to close off predetermined portions of the opening 35 prior to transition into the access configuration to thereby restrict or permit access to contents of the storage container 106 through predetermined portions of the opening 35.

Figure 3:
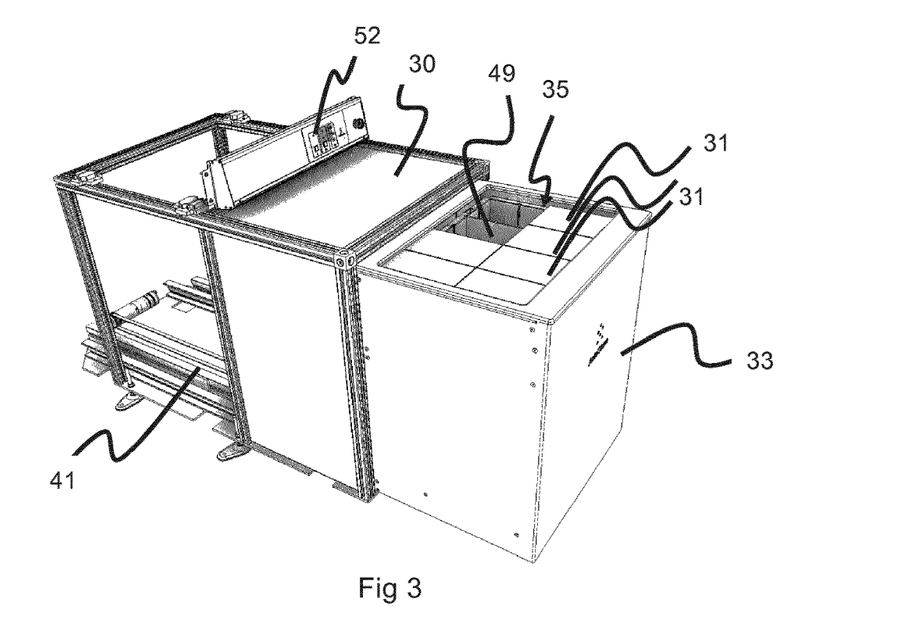
FIG. 3 illustrates a station comprising an access barrier and a housing.

The storage container may comprise a plurality of compartments and the number of covers may correspond to the number of compartments in the storage container 106. FIGS. 2 and 3 shows six covers selectively deployed to close off a respective portion of the opening 35 and thereby restrict access to the respective compartment(s) of the storage container 106. Two of the covers 31 in FIGS. 2 and 3 are not deployed, thereby leaving their respective compartment(s) open.

It is further shown in FIG. 2, that the storage grid 104 comprises a wall surface, comprising wall structure elements 39. The wall structure elements 39 may cover a front part of the storage grid from bottom to top (i.e. from the floor to top of the storage grid structure). The purpose of the wall structure elements 39 may be to prevent personal injuries, to reduce noise, to prevent dust etc. If the wall structure elements are faced towards the outside of a building, the purpose of the wall structure elements 39 may also be to protect the grid structure from theft, vandalism etc., to protect the storage grid structure from weather conditions (rain, snow, wind etc.) etc. The housing 30 and the access barrier 33 may be integrated into the storage grid 104 or it may be connected to the storage grid 104 (as shown in FIGS. 2 and 3).

The system of the present invention is configured to transport a storage container 106, stored in the storage grid 104, to the access barrier 33 and/or to transport the storage container 106 from the access barrier 33 to the storage grid 104.

In operation, when retrieving a product/item from the storage container 106, a user may identify himself by using a user interface 52, for example by means of an access code (the user interface comprising a touch screen, a keyboard, a bar code reader, a QR code reader etc.) or by means of e.g. a credit card (the user interface comprising a card reader), or a smart phone (the user interface comprising an NFC (near field communication) unit) etc.

When identified, a storage control and communication system (not shown) instructs a container handling vehicle 200 to retrieve the storage container 106 containing the pre-ordered product/item and transports the container 106 to the drawer-like device 33. Said storage control and communication system operates the respective cover 31 such that only the compartment containing the pre-ordered item will be open when the storage container 106 is delivered to the opening of the access barrier 33. Thereafter, the drawer-like device 33 is brought from the loading configuration, in which access to the compartment is prevented by the housing 30, to the access configuration in which the compartment is presented to thereby enable access to contents of the storage container 106.

The user may also make a selection and/or purchase an item at the user interface 52, such that the automated storage and retrieval system comprising the station might be operated like big vending machine.

The user may open the drawer-like device 33 by using a handle (not shown) provided on the drawer-like device 33 or the drawer-like device 33 may be automatically operated by an electric or hydraulic push/pull-mechanism (not shown) for the movement of the drawer 33.

When the drawer-like device 33 is closed after opening, a signal may be sent to the above-mentioned storage control and communication system, the signal indicating that the product/item has been picked up. The system may then send a vehicle 200 for retrieving the storage container 106 from the station and storing it into the storage grid 104 again.

Figure 4:
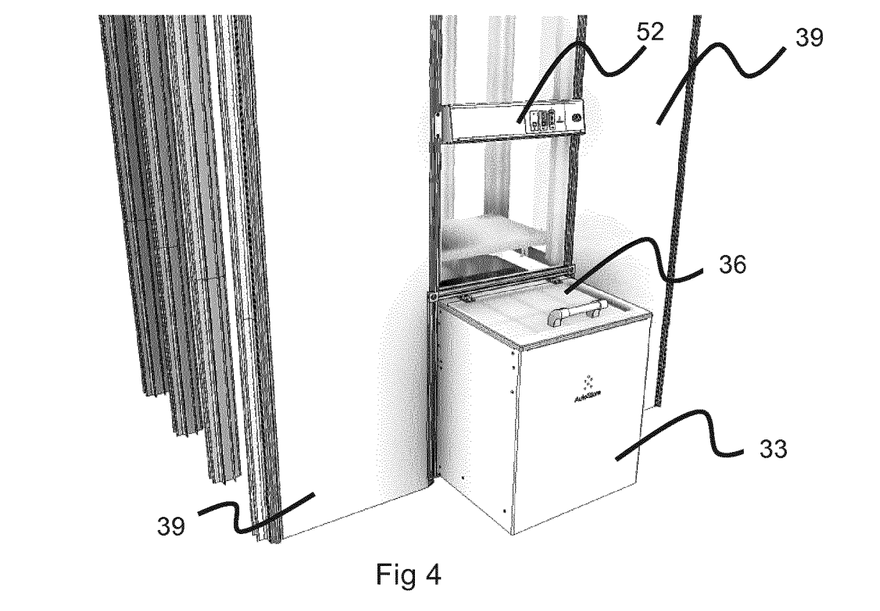
FIG. 4 illustrates a housing comprising a top cover arranged to allow or restrict access to the opening of the access barrier.
Figure 5:
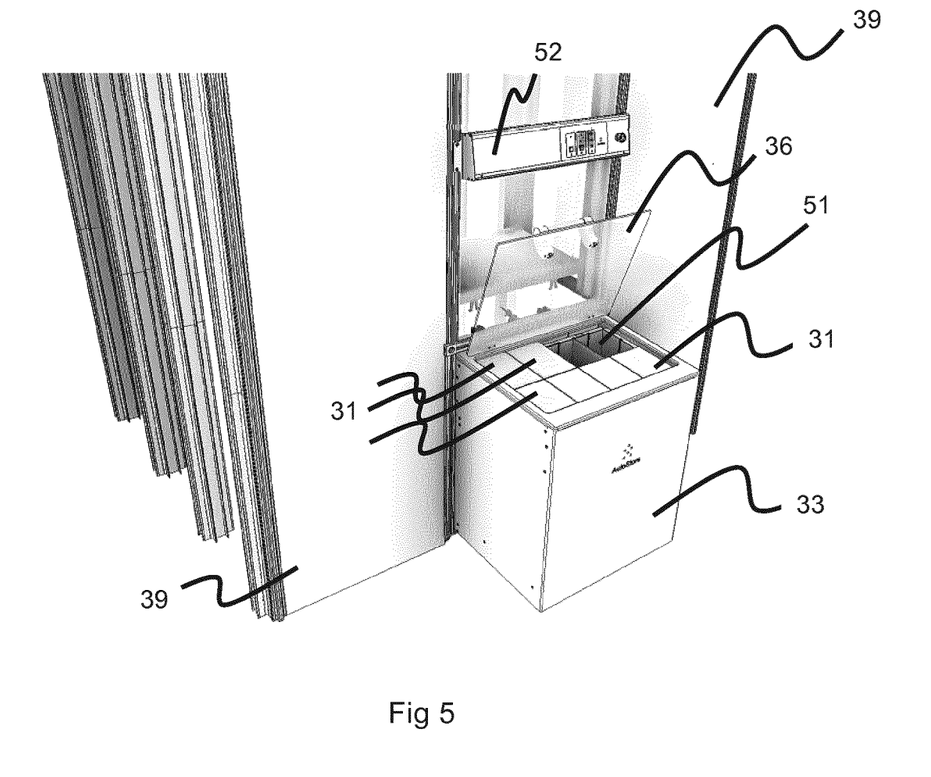
FIG. 5 illustrates the top cover of the housing in the access configuration.

FIGS. 4 and 5 shows another embodiment of the station where the housing 30 is arranged as a top cover 36 connected to the access barrier 33, adjacent to the opening 35 of the access barrier 35.

The access barrier 33 comprises a cabinet with an opening 35, and a plurality of covers 31, wherein each cover 31 is arranged to be selectively deployed to close off a respective portion of the opening 35, and thereby restrict access therethrough.

Each of the plurality of covers 31 is pivotably connected to the access barrier 33 adjacent the opening 35, and each cover 31 is moveable between an initial position in which the cover 31 is not deployed thereby leaving the respective portion of the opening 35 accessible, and a deployed position in which the cover 31 closes off the respective portion of the opening 35.

The station is arranged to transition between;
  a loading configuration in which access to the opening 35 of the access barrier 33 is prevented by the housing 30, and
  an access configuration in which the opening 35 of the access barrier 33 is presented to thereby enable access to contents of the storage container 106 through the opening 35.

The station is configured to deploy the covers 31 to close off predetermined portions of the opening 35 prior to transition into the access configuration to thereby restrict or permit access to contents of the storage container 106 through predetermined portions of the opening 35.

In the access configuration, the top cover 36 of the housing 30 may be lifted such that access to contents of the storage container 106 through predetermined portions of the opening 35 is permitted. The opening of the top cover 36 may be arranged to be opened manually by a handle or automatically by a motor. In figure, 4 and 5 the top cover 36 as transparent, in order to see the storage compartment 51 situated below the top cover 36. It is obvious that different materials can be used having different properties, such as; transparent or not, for the top cover 36.

The top cover 36 may comprise a locking device adapted to lock the top cover 36 such that the top cover 36 cannot be lifted and/or opened when the station 10 is in the loading configuration and unlock the top cover 36 such that the top cover 36 can be lifted and/or opened when the station 10 is in the access configuration.

I embodiments, the housing 30 may also be arranged as a cabinet for housing the access barrier 33. The access barrier 33 may be arranged as a smaller cabinet or a frame structure.

Figure 6:
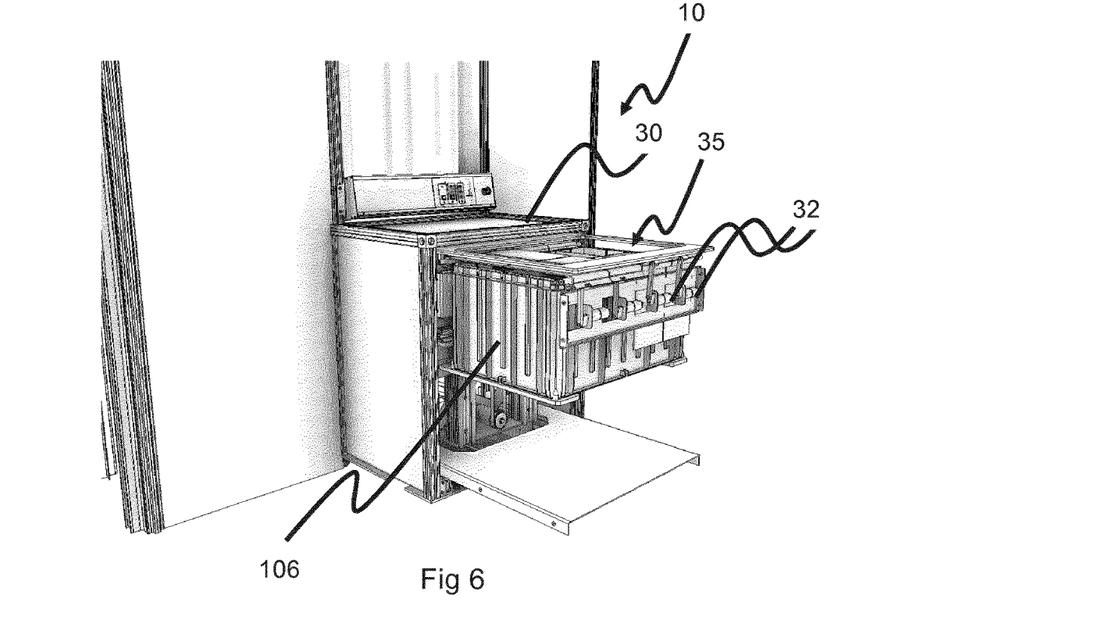
FIG. 6 illustrates a station connected to a storage grid and the access barrier containing a storage container.

FIG. 6 shows the access barrier 33 as a frame structure without side walls. The storage container 106 is lifted to opening 35 of the access barrier 33. The figure also shows two covers 31 in an initial position in which the covers 31 are not deployed thereby leaving the respective portion of the opening 35 accessible. Each of the covers 31 is operated by a respective independent motor 32.

Figure 7:
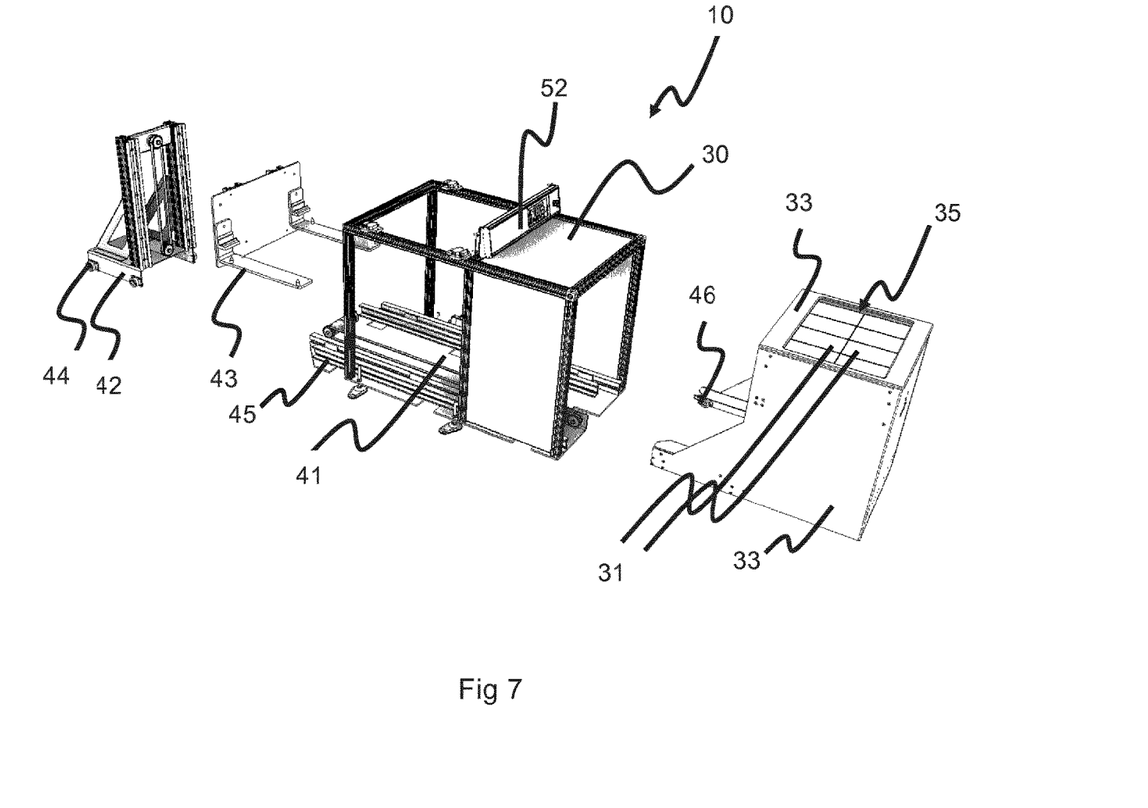
FIG. 7 illustrates a loading mechanism comprising a lifting device and a moving device.
Figure 8:
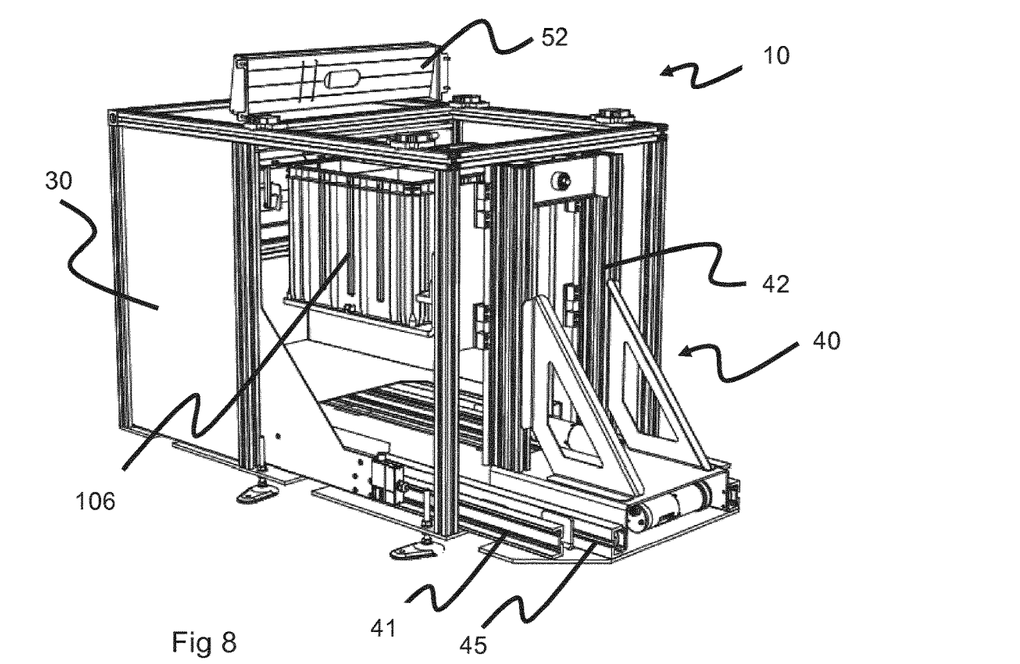
FIG. 8 illustrates a loading mechanism of the station viewed from the back side.
Figure 9:
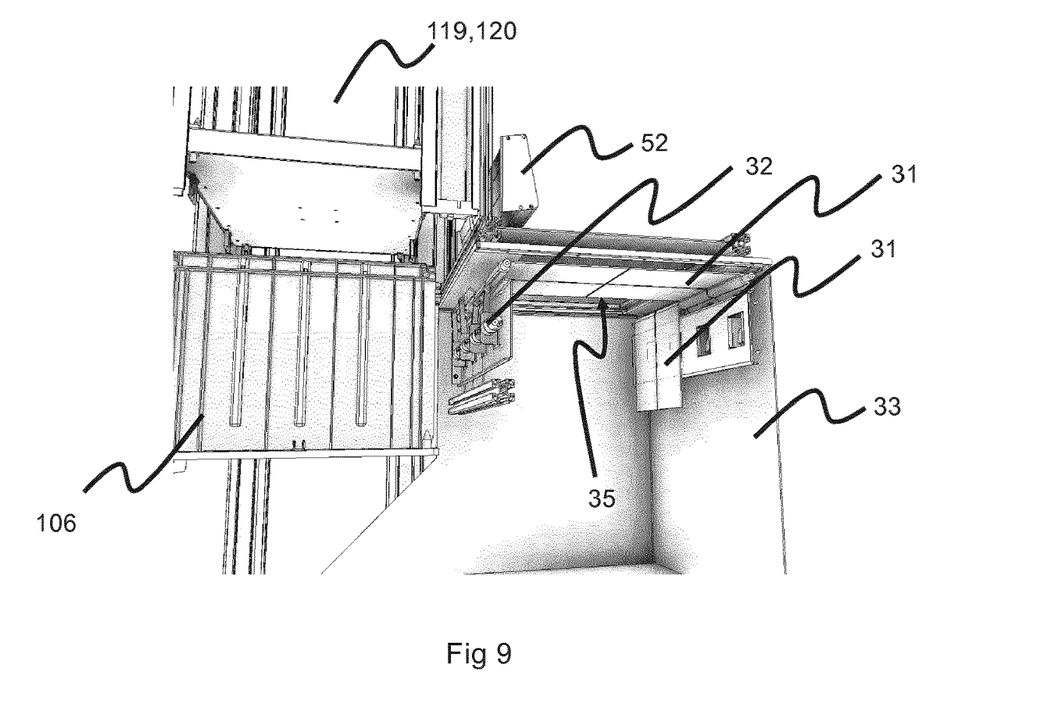
FIG. 9 illustrates a cross sectional view of the station comprising the access barrier located inside the housing.

As shown in FIG. 7 the station comprises a loading mechanism 40. The loading mechanism 40 is arranged to receive the storage container 106 from a delivery column of a storage grid 104 and move it to the opening 35 of the access barrier 33 so that contents of the storage container 106 may be accessed through the opening 35.

The loading mechanism 40 comprises a lifting device 42 and a moving device 41, wherein the lifting device 42 is moveably arranged on the moving device 41. The lifting device may comprise wheels 44 adapted for operating on rails 45 provided as part of the moving device 41.

The lifting device 42 further comprises a support device 43 arranged for receiving and supporting a storage container 106. Once a storage container 106 is received onto the support device 42, the lifting device 42 moves/slides on the moving device 41 into the access barrier 33 and the housing 30, and the storage container further is lifted to the opening 35 of the access barrier 33.

The moving and lifting operation of the storage container 106 is illustrated in FIGS. 10-13. A storage container 106 is received from a delivery column 119,120 of an automated storage and retrieval grid 104 onto the support device 43 of the lifting device 42.

Figure 10:
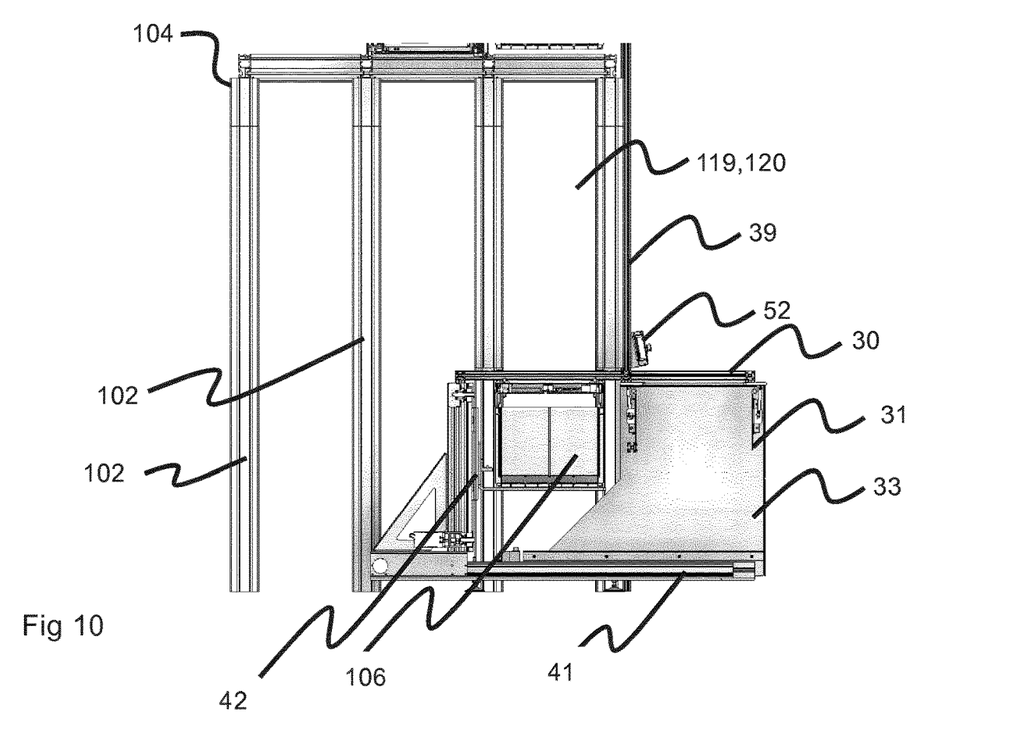
FIG. 10 illustrates a storage container delivered to the loading mechanism of the station.
Figure 11:
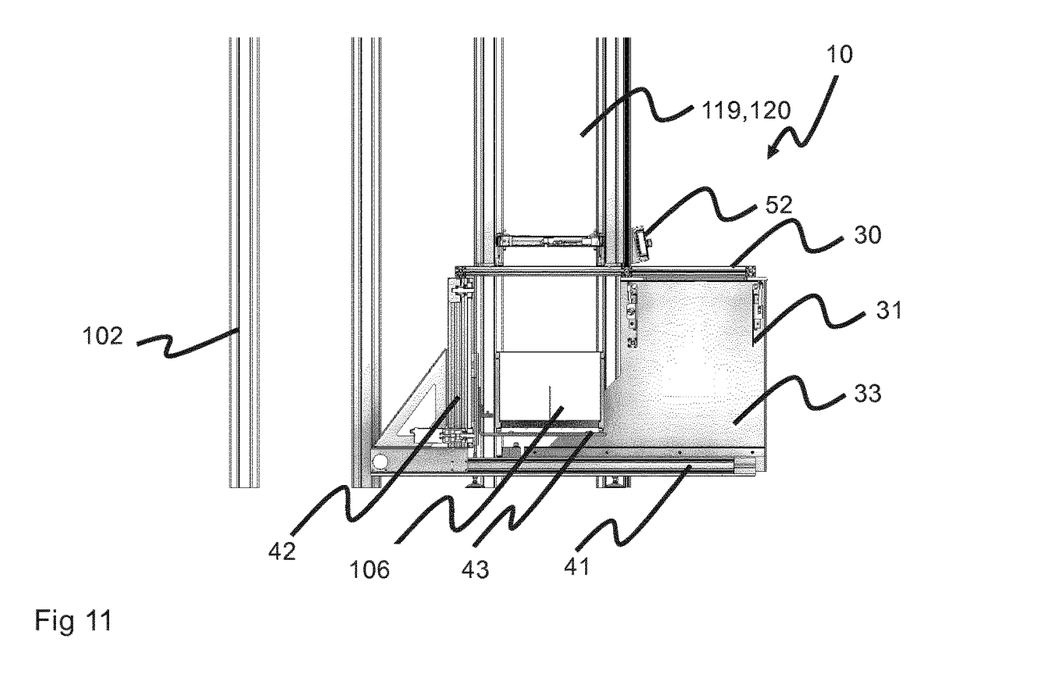
FIG. 11 illustrates the storage container supported by the support device of the loading mechanism.

In FIG. 10, the lifting device is lowering the storage container 106 to a lower position in which it is ready to be moved into the access barrier 33. The access barrier 33 is in the loading configuration, in which access to the opening 35 of the access barrier 33 is prevented by the housing 30. The plurality of covers 31 are in their initial not-deployed position.

Figure 12:
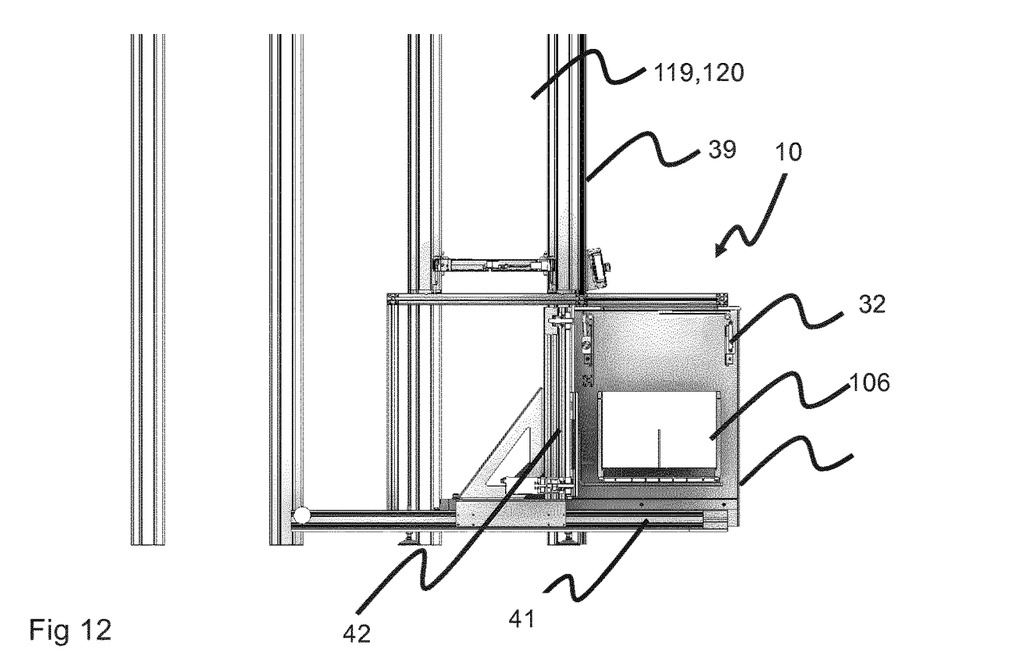
FIG. 12 illustrates the storage container being moved by the moving device into the container carrier and housing.

In FIG. 12, the lifting device 42 moves on a rail system provided as part of the moving device 41 and moves the storage container 106 into the access barrier 33. The housing 30 encloses the access barrier 33. In this position, the covers 31 are individually operated by the motors 32 to selectively deploy to close off a respective portion of the opening 35 and thereby restrict access therethrough.

Figure 13:
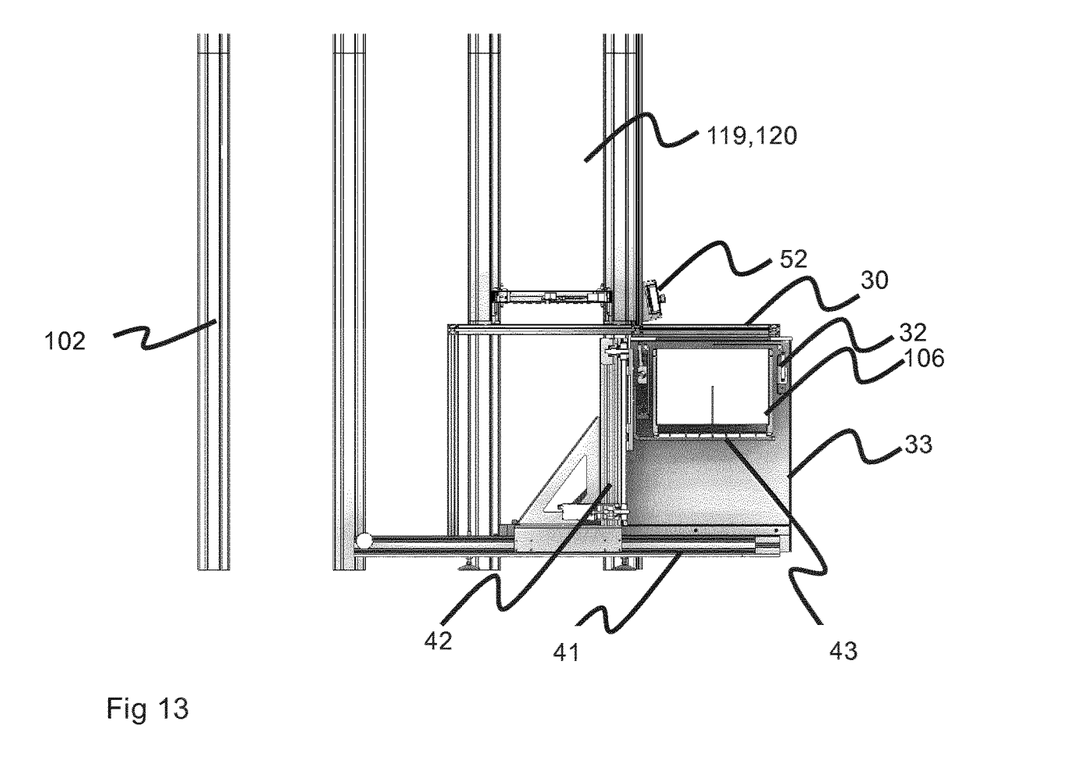
FIG. 13 illustrates the lifting device arranged for lifting the storage container to the opening of the access barrier.

In FIG. 13, the lifting device 42 is lifting the storage container 106 from the lower position to the opening of the access barrier 33.

Figure 14:
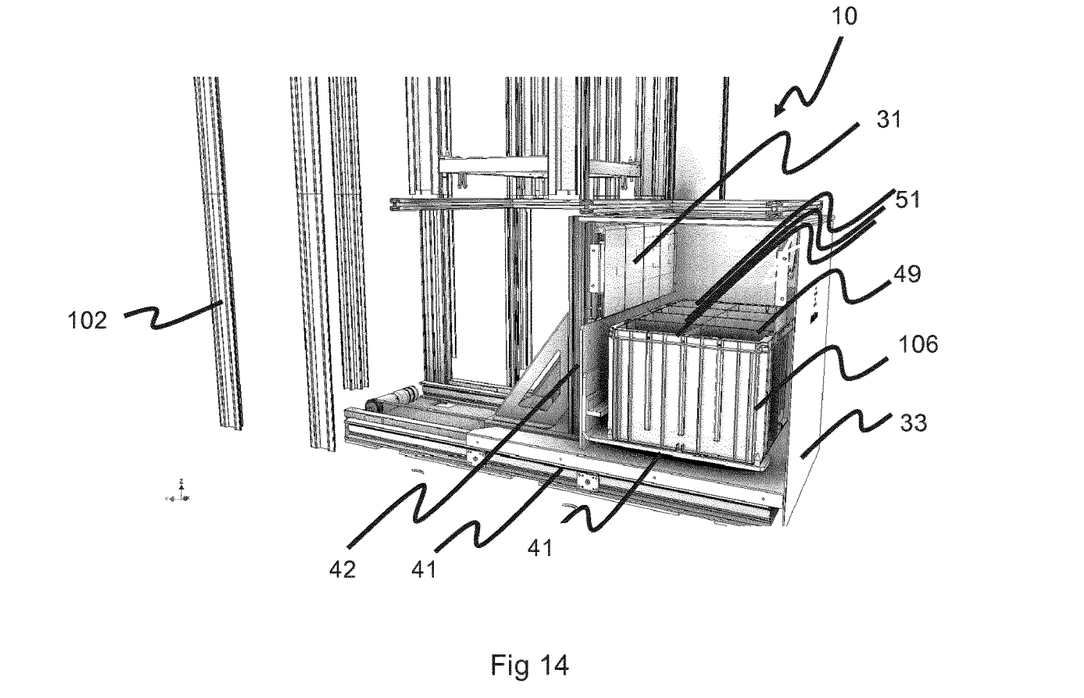
FIG. 14 illustrates a storage container located in the access barrier and the covers of the opening of the access barrier in an undeployed position.
Figure 15:
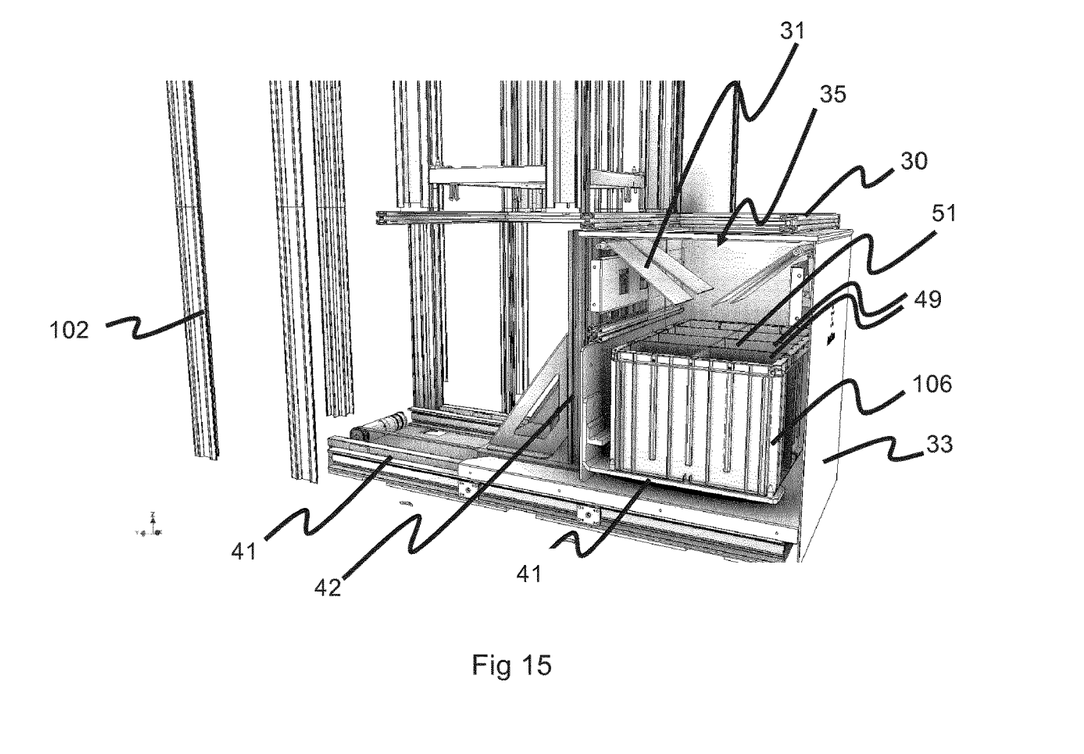
FIG. 15 illustrates the covers of the access barrier operated in the deployed position.

FIGS. 14 and 15 shows the operation of the plurality of covers 31. Each of the plurality of covers 31 is pivotably connected to the access barrier 33 adjacent the opening 35, and each cover 31 is moveable between an initial position (in FIG. 12) in which the cover 31 is not deployed thereby leaving the respective portion of the opening 35 accessible, and a deployed position (in FIG. 13) in which the cover 31 closes off the respective portion of the opening 35.

In FIG. 14, in the initial position, the covers 31 extends at least partially in a vertical direction such that it allows the storage container 106 to pass (when it is lifted from a lower to an upper position) without contact while the storage container 106 is being lifted to the opening 35 of the access barrier 33, thereby leaving the respective portion of the opening 35 accessible such that contents of the storage container 106 may be accessed through the portion.

In FIG. 15, four covers 31 are operated such that they are in the deployed position. Thus, the four covers 31 are operable such that they each extend into a lifting path of the storage container 106 when being moved to the opening 35 of the access barrier 33 by the lifting device 42, so that the storage container 106 urges the covers 31 into their deployed positions.

The system may further comprise a plurality of storage containers 106, wherein each storage container comprises a plurality of compartments 51 with an open end, wherein each of the open ends is closable by the covers 31 of the access barrier 33.

Figure 16:
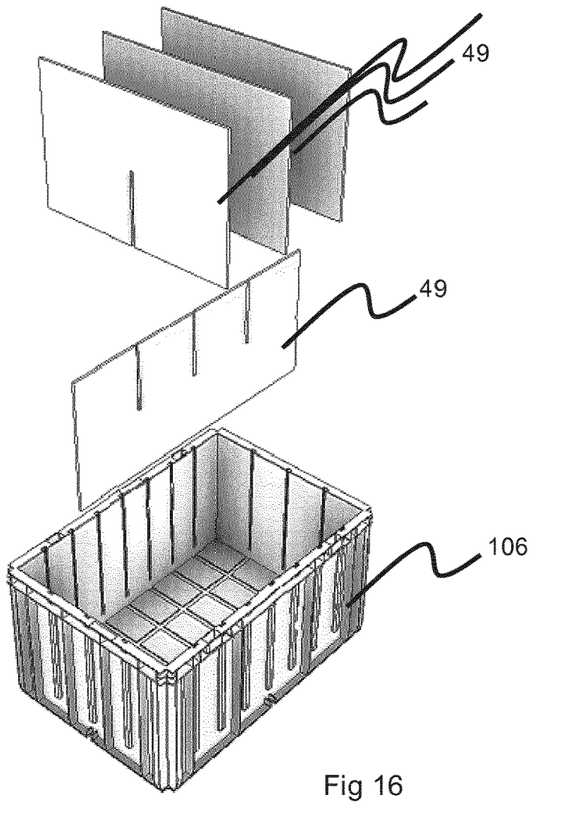
FIG. 16 illustrates a storage container comprising detachable compartment separating walls.
Figure 17:
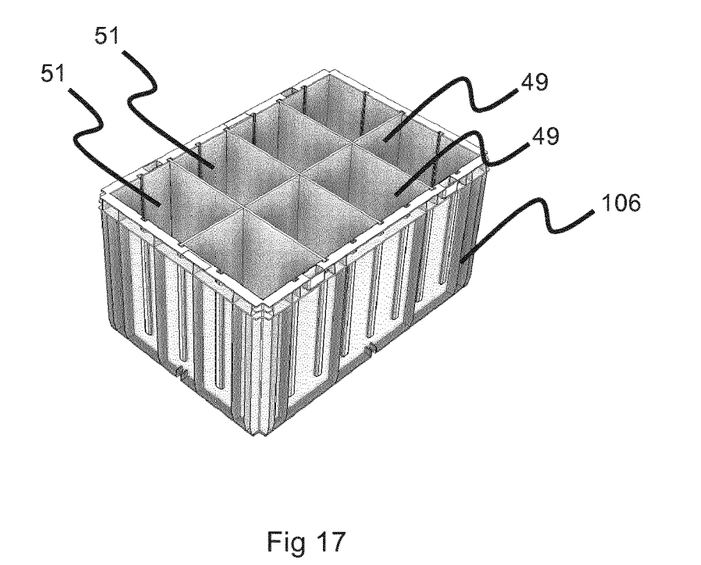
FIG. 17 illustrates a storage container with eight compartments.

As shown in FIG. 16, each of the plurality of the storage containers 106 may comprise at least one detachable compartment-separating wall 49. Said detachable walls 49 are arranged such that they can be removed or folded into the bottom of the compartment 51 such that the size of the compartment 51 of the storage container 106 may be adjusted.

Other sectioning of the compartments 51 of the storage container 106 are of course possible within the scope of the invention.

Preferably, the open end of each of the storage compartments 51 may be closeable by one or more covers 31 of the access barrier 33.

REFERENCE NUMERALS

100 Framework structure
102 Upright members of framework structure
103 Horizontal members of framework structure
104 Storage grid/three-dimensional grid
105 Storage column
106 Storage container
107 Stack
108 Rail system
110 First set of parallel rails in first direction (X)
111 Second set of parallel rails in second direction (Y)
115 Grid opening
119 Delivery column
120 Delivery column
122 Grid cell
140 Delivery system
200 First container handling vehicle
X First direction
Y Second direction
P Horizontal plane of rail system
10 Station
30 Housing
31 Cover of access barrier
32 Motor for operating the cover
33 Access Barrier
35 Opening of the access barrier
36 Top cover of the housing
39 Wall structure element 40 Loading mechanism
41 Moving device
42 Lifting device
43 Support device
44 Wheels of the lifting device
45 Rails/tracks of the moving device
46 Wheels of the drawer-like device
49 Compartment separating wall
51 Compartment in storage container
52 User interface

The invention claimed is:

1. A station for providing access to contents in a storage container of an automated storage and retrieval system, the station comprising:
an access barrier comprising an opening, and a plurality of covers, wherein each cover is arranged to be selectively deployed to close off a respective portion of the opening and thereby restrict access therethrough;
a loading mechanism arranged to receive the storage container and move it to the opening of the access barrier so that contents of the storage container may be accessed through the opening; and
a housing which is able to prevent access to the opening of the access barrier;
wherein the station is arranged to transition between the storage system and the station;
a loading configuration in which access to the opening of the access barrier is prevented by the housing, and
an access configuration in which the opening of the access barrier is presented to thereby enable access to contents of the storage container through the opening; and
wherein the station is configured to deploy the covers to close off predetermined portions of the opening prior to transition into the access configuration to thereby restrict or permit access to contents of the storage container through predetermined portions of the opening;
wherein each of the plurality of covers is pivotably connected to the access barrier adjacent the opening and each cover is moveable between an initial position in which the cover is not deployed thereby leaving the respective portion of the opening accessible, and a deployed position in which the cover closes off the respective portion of the opening;
wherein each of the plurality of covers, in an initial position, extends at least partially in a vertical direction such that it allows the storage container to pass without contact while the storage container is being lifted to the opening of the access barrier, thereby leaving the respective portion of the opening accessible such that contents of the storage container may be accessed through the portion.

2. The station according to claim 1, wherein the loading mechanism comprises a lifting device arranged to lift the storage container up to the access barrier.

3. The station according to claim 2, wherein the cover is operable such that it extends into a lifting path of the storage container when being moved to the opening of the access barrier by the lifting device so that the storage container urges the cover into its deployed position.

4. The station according to claim 2, wherein the loading mechanism comprises a moving device, wherein the lifting device is moveably arranged on the moving device.

5. The station according to claim 4, wherein the lifting device comprises wheels adapted to operate on a first rail provided as part of the moving device.

6. The station according to claim 1, wherein the least one cover is a flap, each flap being operated by a respective independent motor.

7. The station according to claim 1, wherein the housing comprises a top cover for closing off the opening of the access barrier, and wherein the top cover comprises a locking device adapted to lock the top cover such that the top cover cannot be lifted when the station is in the loading configuration, and unlock the top cover such that the top cover can be lifted when the station is in the access configuration.

8. The station according to claim 7, wherein the top cover can be lifted manually or by a motor.

9. The station according claim 1, wherein the access barrier is arranged as a drawer-like device in the housing and wherein the drawer-like device is arranged to transition between the loading configuration and the access configuration.

10. The station according to claim 9, wherein the drawer-like device is actuable by the loading mechanism configured to push the drawer-like device out of the housing.

11. The station according to claim 9, wherein drawer-like device comprises wheels arranged to operate on a second rail provided on the loading mechanism.

12. An automated storage and retrieval system comprising a station for delivery of one or more items stored in a storage container, the system comprising;
a storage grid for storing storage containers arranged in stacks,
a station for providing access to contents in a storage container of an automated storage and retrieval system, the station comprising:
an access barrier comprising an opening, and a plurality of covers, wherein each cover is arranged to be selectively deployed to close off a respective portion of the opening and thereby restrict access therethrough;
a loading mechanism arranged to receive the storage container and move it to the opening of the access barrier so that contents of the storage container may be accessed through the opening; and
a housing which is able to prevent access to the opening of the access barrier;
wherein the station is arranged to transition between;
a loading configuration in which access to the opening of the access barrier is prevented by the housing, and
an access configuration in which the opening of the access barrier is presented to thereby enable access to contents of the storage container through the opening;
wherein the station is configured to deploy the covers to close off predetermined portions of the opening prior to transition into the access configuration to thereby restrict or permit access to contents of the storage container through predetermined portions of the opening;
wherein each of the plurality of covers is pivotably connected to the access barrier adjacent the opening and each cover is moveable between an initial position in which the cover is not deployed thereby leaving the respective portion of the opening accessible, and a deployed position in which the cover closes off the respective portion of the opening;
wherein each of the plurality of covers, in an initial position, extends at least partially in a vertical direction such that it allows the storage container to pass without contact while the storage container is being lifted to the opening of the access barrier, thereby leaving the respective portion of the opening accessible such that contents of the storage container may be accessed through the portion.

13. The system according to claim 12, wherein the system further comprises a plurality of storage containers wherein each storage container comprises a plurality of compartments with an open end, wherein each of the open end is closable by the covers of the access barrier.

14. The system according to claim 13, wherein each of the plurality of the storage containers comprises at least one detachable compartment-separating wall, such that the size of each of the plurality of compartments can be adjusted.

15. The system according to claim 12, wherein the storage grid comprises a wall surface, comprising wall structure elements.

* * * * *